US008670720B2

(12) United States Patent
Abhaikumar et al.

(10) Patent No.: US 8,670,720 B2
(45) Date of Patent: Mar. 11, 2014

(54) DEVICES AND METHODS FOR PHASE SHIFTING A RADIO FREQUENCY (RF) SIGNAL FOR A BASE STATION ANTENNA

(71) Applicant: Thiagarajar College of Engineering, Tamilnadu (IN)

(72) Inventors: Varadhan Abhaikumar, Tamilnadu (IN); Seenivasan Raju, Tamilnadu (IN); Subburaj Ramprasath Deepak Ram, Tamilnadu (IN); Rajagopal Senthilkumar, Tamilnadu (IN); Prabhakaran Vasikaran, Tamilnadu (IN)

(73) Assignee: Thiagarajar College of Engineering, Tamilnadu, IN (US)

( * ) Notice: Subject to any disclaimer, the term of this patent is extended or adjusted under 35 U.S.C. 154(b) by 0 days.

(21) Appl. No.: 13/710,330

(22) Filed: Dec. 10, 2012

(65) Prior Publication Data

US 2013/0099873 A1 Apr. 25, 2013

Related U.S. Application Data

(63) Continuation of application No. 12/723,161, filed on Mar. 12, 2010, now abandoned.

(30) Foreign Application Priority Data

Jan. 28, 2010 (IN) ............................ 222/CHE/2010

(51) Int. Cl.

| | |
|---|---|
| *H04B 1/00* | (2006.01) |
| *H04B 15/00* | (2006.01) |
| *H04B 7/00* | (2006.01) |
| *H04B 1/10* | (2006.01) |
| *H04M 1/00* | (2006.01) |
| *H01P 3/08* | (2006.01) |
| *H01P 7/00* | (2006.01) |

(52) U.S. Cl.
USPC ......... 455/63.4; 455/562.1; 455/42; 455/304; 455/276.1; 455/523; 333/204; 333/219; 333/246; 333/238

(58) Field of Classification Search
USPC ............ 455/63.4, 80, 81, 107, 111; 343/771, 343/768
See application file for complete search history.

(56) References Cited

U.S. PATENT DOCUMENTS 6,667,714 B1 * 12/2003 Solondz ........................ 342/368
2003/0043071 A1 * 3/2003 Lilly et al. .................... 342/368

(Continued)

FOREIGN PATENT DOCUMENTS

EP 1170817 A1 1/2002

OTHER PUBLICATIONS

Hwang, R., "A Low-Cost Electrical Beam Tilting Base Station Antennas for Wireless Communication System," IEEE Trans. on Antennas and Propagation, vol. 52, Jan. 2004, pp. 115-121.*

(Continued)

*Primary Examiner* — Temesgh Ghebretinsae
*Assistant Examiner* — Devan Sandiford
(74) *Attorney, Agent, or Firm* — Brundidge & Stanger, P.C.

(57) ABSTRACT

Methods and devices for phase shifting an RF signal for a base station antenna are provided. The device includes a transmission line that has a stationary ground plane coupled to the top of a substrate and a signal line on the bottom of the substrate. The signal line has an input port and an output port. The input port receives the RF signal with a certain phase and travels across the bottom of the substrate to the output port. The RF signal has a different phase at the output port because defected ground structures etched on the stationary ground plane shift the phase of the RF signal. In addition, the device includes a movable ground plane that may cover a portion of the defected ground structures, the substrate, and the stationary ground plane such that the moveable ground plane further adjusts the phase of the RF signal.

20 Claims, 9 Drawing Sheets

(56) References Cited

U.S. PATENT DOCUMENTS

| | | | | |
|---|---|---|---|---|
| 2007/0090398 | A1* | 4/2007 | McKinzie, III | 257/192 |
| 2009/0023447 | A1* | 1/2009 | Hagerman et al. | 455/436 |
| 2009/0231068 | A1 | 9/2009 | Das et al. | |

OTHER PUBLICATIONS

Weng. L., "An Overview on Defected Ground Structure," Progress in Electromagnetics Research B, vol. 7, 2008, pp. 173-189.*

Ahn, D., et al., "A Design of the Low-Pass Filter Using the Novel Microstrip Defected Ground Structure," IEEE Transaction on Microwave Theory and Techniques, vol. 49, Issue 1, pp. 86-93 (2001).

Chen, X.Q., et al., "A Novel Low Pass Filter Using Elliptic Shape Defected Ground Structure," Progress in Electromagnetics Research B, vol. 9, pp. 117-126 (2008).

Elamaran, B., et al., "A beam-steerer using reconfigurable PBG ground plane," IEEE MTI-S International Microwave Symposium Digest, vol. 2, pp. 835-838 (2000).

Ellinger, F., et al., "Varactor-loaded transmission-line phase shifter at C-band using lumped elements," IEEE Transaction on Microwave Theory and Techniques, vol. 51, Issue 4, pp. 1135-1140 (2003).

Hayden, J.S., et al., "2 and 4-Bit DC-18 GHz Microstrip MEMS Distributed Phase Shifters," IEEE MTT-S International Microwave Symposium Digest, vol. 1, pp. 219-222 (2001).

Maruhashi, K., et al., "Design and performance of aKa-band monolithic phase shifter utilizing non resonant FET switches," IEEE Transaction on Microwave Theory and Techniques, vol. 48, Issue 8, pp. 1313-1317 (2000).

Nagra, A.S., and York, R.A., "Distributed analog phase shifters with low insertion loss," IEEE Transaction Microwave Theory and Techniques, vol. 47, Issue 9, pp. 1705-1711 (1999).

Sellal, K., et al., "A New Substrate Integrated Waveguide Phase Shifter," 36th European Microwave Conference, pp. 72-75 (2006).

Shafai, C., et al., "Reconfigurable Ground Plane Membranes for Analog/Digital Microstrip Phase Shifters and Frequency Agile Antenna," 2005 International Conference on MEMS, NANO and Smart Systems, pp. 287-289 (2005).

Hwang, R., "A Low-Cost Electrical Beam Tilting Base Station Antennas for Wireless Communication System, " IEEE Trans. on Antennas and Propagation, vol. 52, Jan. 2004, pp. 115-121.

Weng, L., "An Overview on Defected Ground Structure," Progress in Electromagnetics Research B, vol. 7, 2008, pp. 173-189.

* cited by examiner $A=M_1\sin(\omega_X t+\psi_1)$ $B=M_2\sin(\omega_X t+\psi_2)$

DEVICES AND METHODS FOR PHASE SHIFTING A RADIO FREQUENCY (RF) SIGNAL FOR A BASE STATION ANTENNA

CROSS-REFERENCE TO RELATED APPLICATION

The present application is a Continuation of U.S. Ser. No. 12/723,161, filed Mar. 12, 2010, which claims priority under 35 U.S.C. §119 to a corresponding patent application filed in India and having application number 222/CHE/2010, filed on Jan. 28, 2010, the entire contents of which are herein incorporated by reference.

BACKGROUND

Cellular networks have limited capacity for transmitting and receiving voice calls and electronic data (e.g., text messages, multimedia messages, email, web browsing, etc.) between base stations and cellular telephones due to the finite frequency bandwidth or spectrum available to the network. A voice call and/or electronic data can be delivered to a cellular telephone using a radio frequency (RF) signal at a certain operating frequency. Capacity in cellular networks may be increased by implementing a frequency reuse scheme. In such a scheme, RF signals with the same operating frequency may be used by different cellular telephone users in different cells. Typically, the different users are several cells apart to limit the interference between the RF signals of the different users. However, significant interference between the users may still exist which can decrease quality of the voice calls or corrupt the electronic data received by the different users.

An approach to reducing interference due to frequency reuse may include tilting antenna beams of base stations of cellular networks such that the transmitted RF signal is confined to the cell. Beam tilting may be performed in several different ways including mechanical, electrical, and optical methods. Electronic beam tilting can be used in cellular applications as well as satellite communication networks, smart weapons, radar applications, and other RF systems where RF signals may interfere with each other.

Decreases in a quality of service in such systems and applications can occur when two or more RF signals are in phase with each other resulting in the RF signals destructively interfering with each other. Beam tilting may be achieved by varying the phase of the transmitted RF signal. The phase variation can be performed in two ways, for example. First, the phase can be adjusted by changing the operating frequency of the signal. This may not be desirable in some applications, such as cellular applications, because the transmitted signal would not be properly decoded at the receiver. Secondly, electronic phase shifters can be used to vary the phase at a fixed operating frequency. However, traditional electronic phase shifters may be expensive as well as may have high power consumption requirements.

SUMMARY

Within embodiments described below, a device for phase shifting an RF signal for a base station antenna is disclosed. The device includes a transmission line that delivers an RF signal from an RF transmitter to the base station antenna as well as a substrate with a top planar surface and a bottom planar surface. The device also includes a stationary ground plane coupled to the top planar surface of the substrate and a signal line on the bottom planar surface of the substrate. The signal line has an input port and an output port and is made of conducting material. The input port receives the RF signal with a certain phase from the RF transmitter then the conducting material transmits the RF signal across the bottom planar surface of the substrate to the output port. The RF signal has a different phase at than at the output port. The device further includes one or more types of defected ground structures on the top planar surface of the substrate. The defected ground structure may be a short stem dumbbell structure or a long stem dumbbell structure. The defected ground structures may shift the phase of the RF signal from the phase at the input port to the different phase at the output port. The difference between the phase at the input port and the phase at the output port is a phase shift of the RF signal. In addition, the device includes a movable ground plane that may cover a portion of the defected ground structures, the top planar surface of the substrate, and the stationary ground plane to further adjust the phase shift of the RF signal.

Another embodiment of the present disclosure includes a method for phase shifting an RF signal for a base station antenna that comprises receiving an RF signal with a certain phase at an input port of a signal line and transmitting the RF signal across the signal line to an output port. The signal line is on a bottom planar surface of a substrate. The method also includes shifting a phase of the RF signal from a phase at the input port to a different phase at the output port using one or more types of defected ground structures. The top of a stationary ground plane attached to a top planar surface of the substrate may be etched with the defected ground structures. Types of defected ground structures may include a short stem dumbbell structure and a long stem dumbbell structure. Further, a difference between the phase of the RF signal at the input port and the different phase at the output port is a phase shift of the RF signal. Additionally, the method includes further adjusting the phase shift of the RF signal by covering a portion of the one or more defected ground structures, the stationary ground plane, and the top planar surface of the substrate with a moveable ground plane and providing the RF signal with the different phase at the output port.

In yet another embodiment, another a method for phase shifting an RF signal for a base station antenna is disclosed using a transmission line that includes transmission line components such as signal line, a substrate, a stationary ground plane, defected ground structures, and a moveable ground plane. The method includes receiving a target beam tilt value at the user interface of the computer. The method also includes calculating a target phase shift based on the target beam tilt value and the dimensions of the transmission line and the transmission line components. Further, the method includes determining a target distance to slide the moveable ground plane to cover portions of the transmission line and the transmission line components to achieve the target phase shift. Additionally, the method includes sending instructions to a microcontroller to rotate a stepper motor a certain amount that translates to the target distance for sliding the moveable ground plane.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
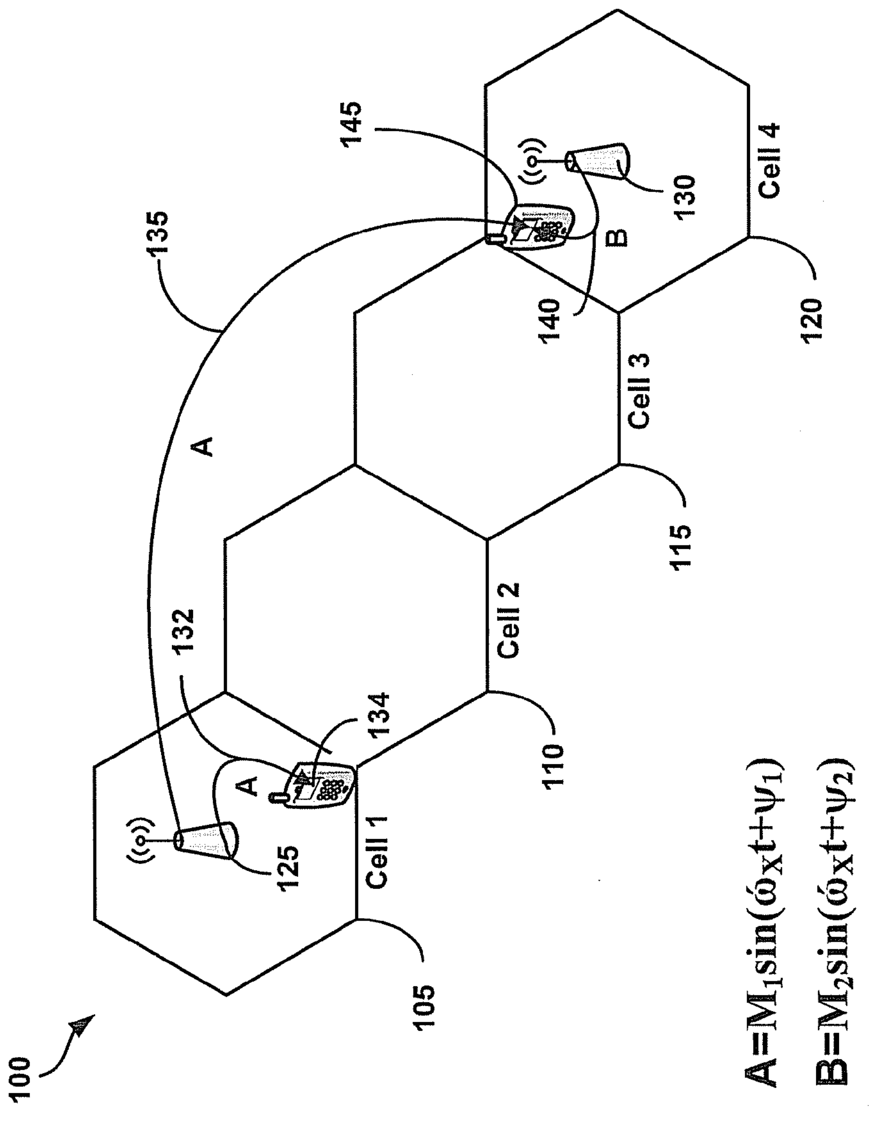
FIG. 1 is an example cellular network illustrating signal interference using a frequency reuse scheme.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

A cellular network may have limited bandwidth or frequency spectrum available to transmit voice calls or electronic data (e.g. text messaging, multimedia messaging, web browsing, email, etc.) to network users with cellular telephones, smartphones, laptops, personal digital assistants (PDAs) or other user terminals. A cellular service provider may utilize different transmission schemes to maximize capacity to in the cellular network. Example transmission schemes may include Frequency Division Multiple Access (FDMA), Time Division Multiple Access (TDMA), and Code Division Multiple Access (CDMA). Further, a transmission scheme utilizes a RF signal at a particular operating frequency in the frequency spectrum to deliver a voice call or electronic data to a particular user terminal. Further, to maximize capacity in the cellular network, the service provider may implement a frequency reuse scheme. A frequency reuse scheme allows different user terminals, separated by several cells, to use the same frequency to receive voice calls and electronic data. However, the RF signal to each different user terminal may interfere with each other to reduce the quality of voice calls or corrupt the electronic data.

FIG. 1 is an example cellular network 100 illustrating signal interference using a frequency reuse scheme. The cellular network 100 includes four cells, Cell 1 (105), Cell 2 (110), Cell 3 (115), and Cell 4 (120). In Cell 1 (105), a base station 125 transmits a RF signal A (132) to a User 1 Terminal (134). The RF signal A (132) may carry a voice call or electronic data and may be of the form $A=M_1 \sin(\acute{\omega}_x t+\psi_1)$ where $M_1$ is the amplitude, $\acute{\omega}_x$ is the frequency, and $\psi_1$ is the phase of RF signal A. Alternatively, in Cell 4 (120) a base station 130 transmits a RF signal B (140) to a User Terminal 2 (145). The RF signal B (14) may also carry a voice call or electronic data to the User 2 Terminal (145) and may be of the form $B=M_2 \sin(\acute{\omega}_x t+\psi_2)$ where $M_2$ is the amplitude, $\acute{\omega}_x$ is the frequency, and $\psi_2$ is the phase of RF signal B.

The cellular service provider may implement a frequency reuse scheme such that RF signals A and B have the same operating frequency $\acute{\omega}_x$. Consequently, User Terminal 2 (145) may receive RF signal A (135) from Cell 1 (105) such that RF signal A (135) may interfere with RF signal B (140) to distort the voice call or corrupt electronic data destined for User Terminal 2 (145). For example, if $\theta_1$ is out of phase from $\theta_2$, then RF signal A (135) and RF signal B (140) destructively interfere with each other resulting in a decrease in quality of service to User Terminal 2 (145).

Figure 2:
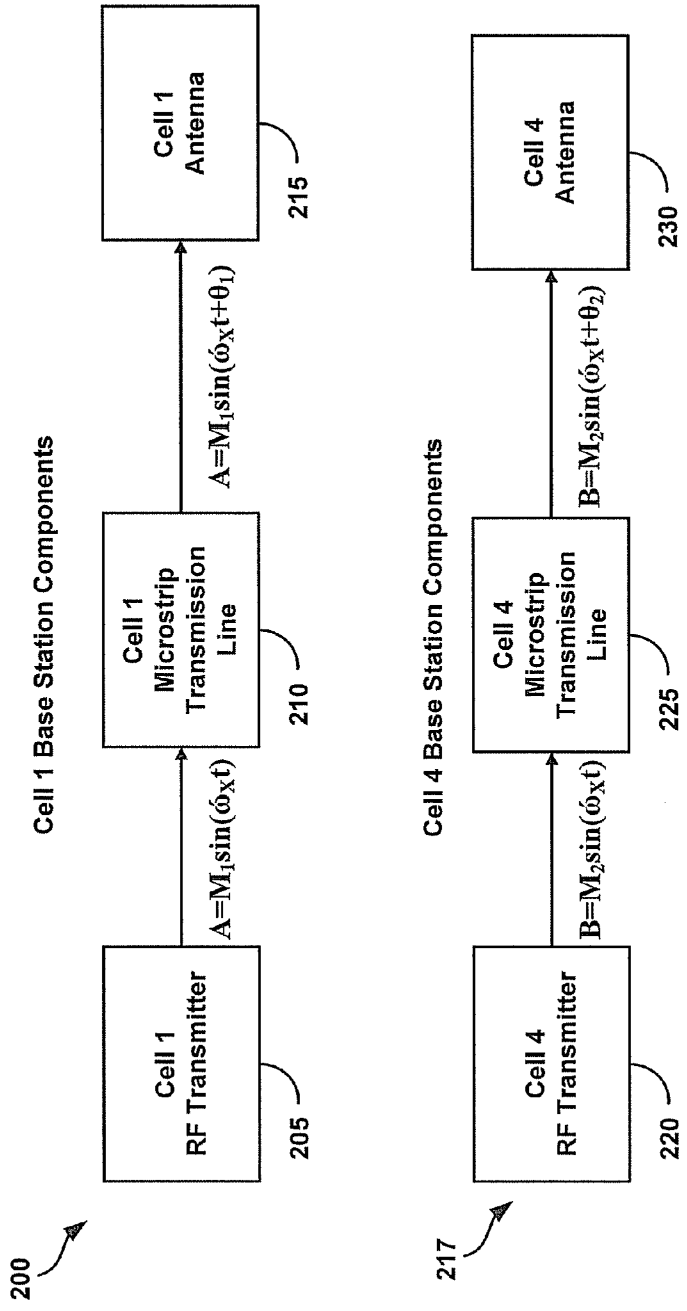
FIG. 2 is an example functional block diagram of a cellular base station using a microstrip transmission line to phase shift an RF signal.

Interference between RF signals in cellular networks may occur when two or more RF signals are out of phase with each other resulting in the RF signals destructively interfering with each other. A cellular service provider may implement several mechanisms to control a phase of an RF signal that may include using a microstrip transmission line. FIG. 2 is an example functional block diagram of a base station 200 for Cell 1 and a base station 217 for Cell 4, each base station using a microstrip transmission line to control a phase shift of the RF signal. The base station 200 for Cell 1 may have an RF transmitter 205 that generates an RF signal $A=M_1 \sin(\acute{\omega}_x t)$ where $M_1$ is the amplitude and $\acute{\omega}_x$ is the frequency. The RF signal may then be transmitted over a microstrip transmission line 210. The microstrip transmission line 210 may shift or control a phase of the RF signal A. The microstrip transmission line 210 may provide an output RF signal A with a phase shift such as $A=M_1 \sin(\acute{\omega}_x t+\theta_1)$ to a base station antenna 215 where $\theta_1$ is the phase shift. Further, the base station 217 for Cell 4 may also have an RF transmitter 220 that generates an RF signal $B=M_2 \sin(\acute{\omega}_x t)$ where $M_2$ is the amplitude and $\acute{\omega}_x$ is the frequency. The RF signal B may then be transmitted over a microstrip transmission line 225 to shift or control a phase of RF signal B. The microstrip transmission 225 line may provide an output RF signal B with a phase shift such as $B=M_2 \sin(\acute{\omega}_x t+\theta_2)$ where $\theta_2$ is the phase shift. However, the service provider may construct the microstrip transmission lines (210, 225) to control $\theta_1$ and $\theta_2$ such that the two RF signals do not interfere with each other when transmitted to different user terminals in a cellular network.

In example embodiments, electronic phase shifters may be incorporated in a microstrip transmission line that is coupled between an RF transmitter at a cellular base station in the base station antenna or antenna array. The microstrip transmission line may include a substrate with a stationary ground plane attached to one side and the signal line carrying the RF signal from the RF transmitter on an opposite side. Defected Ground Structures (DGS) may be etched into the stationary ground plane. DGS structures may change the capacitance and inductance of the microstrip transmission line and thus vary the phase of the RF signal. Further, the transmission line may include a moveable ground plane that covers portions of the DGS structures, altering the capacitance and inductance to further adjust the phase of the RF signal. An equivalent inductance-capacitance (LC) circuit may be used to model the effects of the DGS structures (may be fully or partially covered by moveable ground plane) on the RF signal carried by the transmission line. DGS structures may take many different forms or shapes. These may include triangular, elliptical, rectangular, and dumbbell forms. A different LC circuit may be used to model each different form or shape of a DGS structure. Values for the inductance and capacitance of the LC circuit model may be a function of the dimensions of the DGS structures. Therefore, the phase of the RF signal traveling along the transmission line can be shifted by varying the dimensions of the DGS structures.

In addition, a base station antenna system may have multiple antenna elements in an array and a separate phase shifter may be connected at the input of each antenna element. For example, an array of five antenna elements may require five different phase shifters. The phase shifters can be separate units or as a single phase shifter bank with five parallel signal lines and the corresponding DGS structures etched or printed on the bottom of the transmission line. In such an example, the movable ground plane may be a single unit that slides over the entire phase shifter bank.

Figure 3:
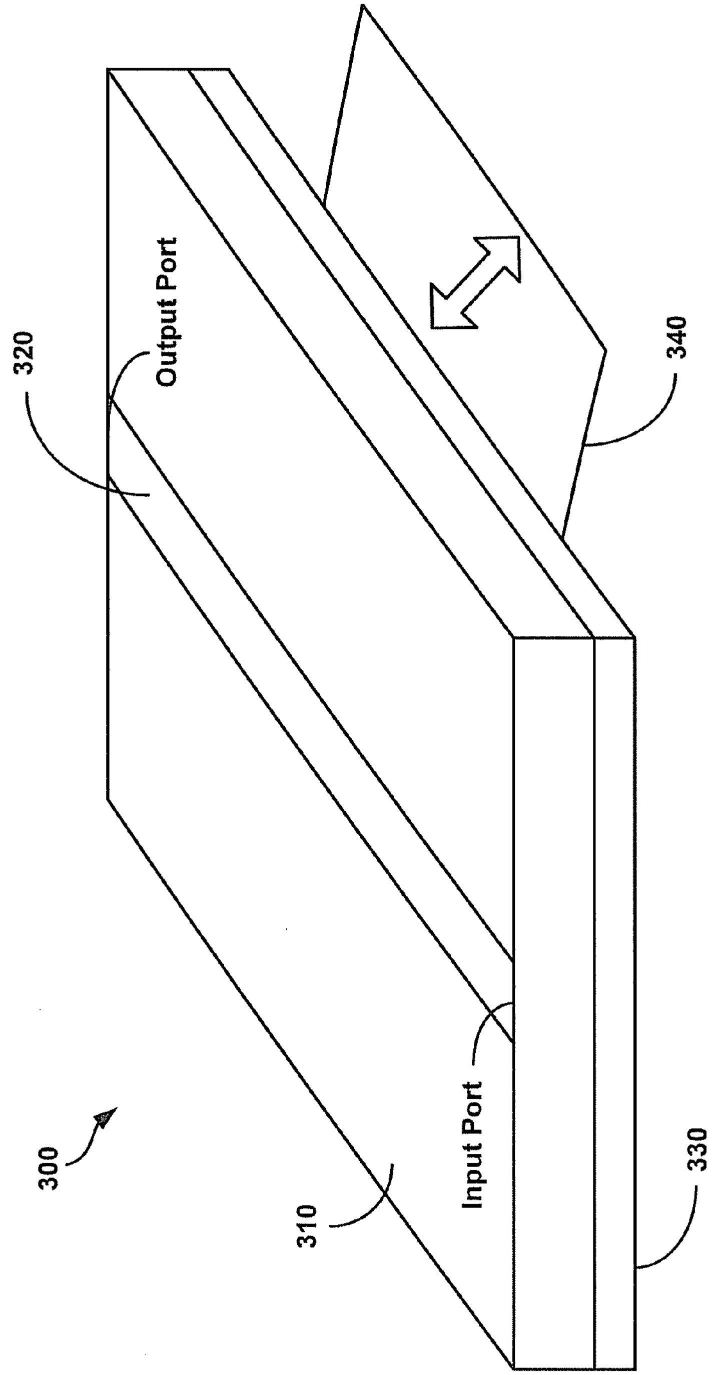
FIG. 3 is an example of a microstrip transmission line used to phase shift an RF signal.

FIG. 3 is an example of a microstrip transmission line 300 used to phase shift an RF signal. The microstrip transmission line 300 may have an input port and an output port. The input port may be coupled to an RF transmitter that generates and modulates the RF signal. Further, the input port transmits the RF signal across the microstrip transmission line along a signal line 320 to the output port. In addition, the output port may be coupled to a base station antenna that may direct the RF signal to a user terminal. The microstrip transmission line 300 may also include a substrate 310. The substrate 310 may comprise several different types of materials that may include a type of dielectric material, for example. On one side of the substrate 310 is the signal line 320. The signal line 320 comprises conducting material that carries the RF signal from the input port to the output port. Coupled onto the opposite side of the substrate 310 is a stationary ground plane 330. It will be shown when describing FIG. 4 that Defected Ground Structures (DGS) may be etched into the stationary ground plane 330 to shift a phase of the RF signal as the RF signal travels across the microstrip transmission line 300 along the signal line 320. In addition, a moveable ground plane 340 may be used to cover a portion or all of the stationary ground plane 330 including a portion or all of the DGS structures to further adjust the phase of the RF signal, for example.

Figure 4:
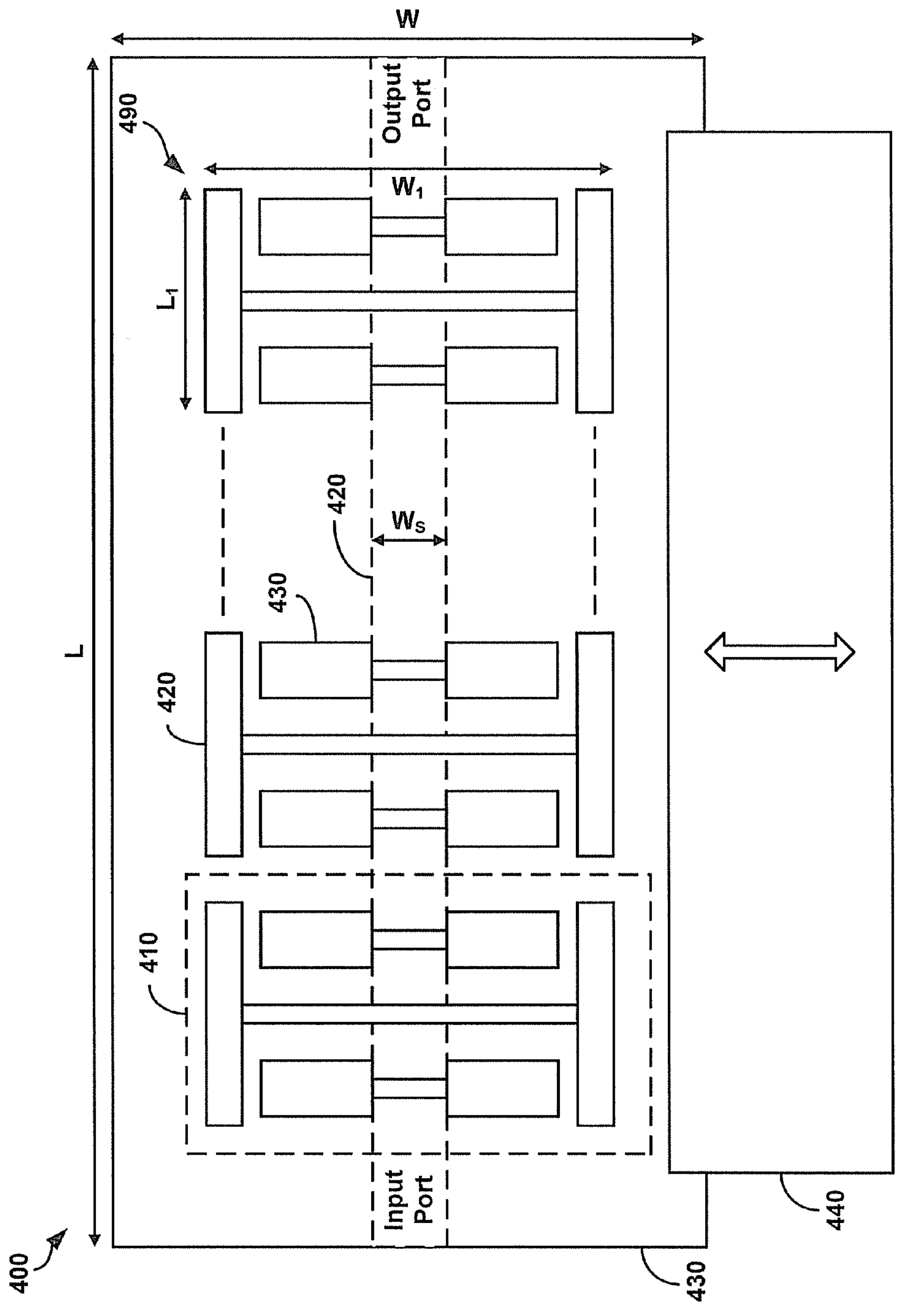
FIG. 4 is another example of a microstrip transmission line used to phase shift an RF signal.

FIG. 4 illustrates a microstrip transmission line 400 used to phase shift an RF signal. A stationary ground plane 430 is coupled to a substrate (not shown). A signal line 420 is coupled to an opposite side of the substrate with respect to the stationary ground plane 430. A series of Defected Ground Structures (DGS) 490 may be etched into the stationary ground plane 430 comprising one or more unit DGS structures (410). A DGS structure is generated by etching conducting material into certain patterns on the stationary ground plane 430. The series of DGS structures may comprise a nested dumbbell pattern 410, for example. That is, the unit DGS structure 410 may include two short stem dumbbells 430 nested within a long stem dumbbell pattern 420. The series of DGS structures 490 may shift a phase of an RF signal traveling along the signal line 420 based on the transmission line components (e.g. substrate, signal line 420, stationary ground plane 430, and a moveable ground plane 440). In addition, the moveable ground plane 440 may be manually or motor controlled to cover a portion of the stationary ground plane 430 including a portion of the series of DGS structures 490 to further adjust the phase of the RF signal.

Dimensions of the ground plane as well the as dimensions of the DGS structures may effect the phase shift of the RF signal traveling along the signal line. The dimensions that vary a phase of the RF signal may include the length (L) and width (W) of the stationary ground plane 430. Further dimensions that effect the phase may include length $L_1$ and width $W_1$ of a unit 410 in the series of DGS structures. In addition, the width $W_s$ of the signal line 420 may vary the phase. Example dimensions may include L=113 mm, W=70 mm, $L_1$=8 mm, $W_1$=40 mm, and $W_s$=3 mm.

Figure 5:
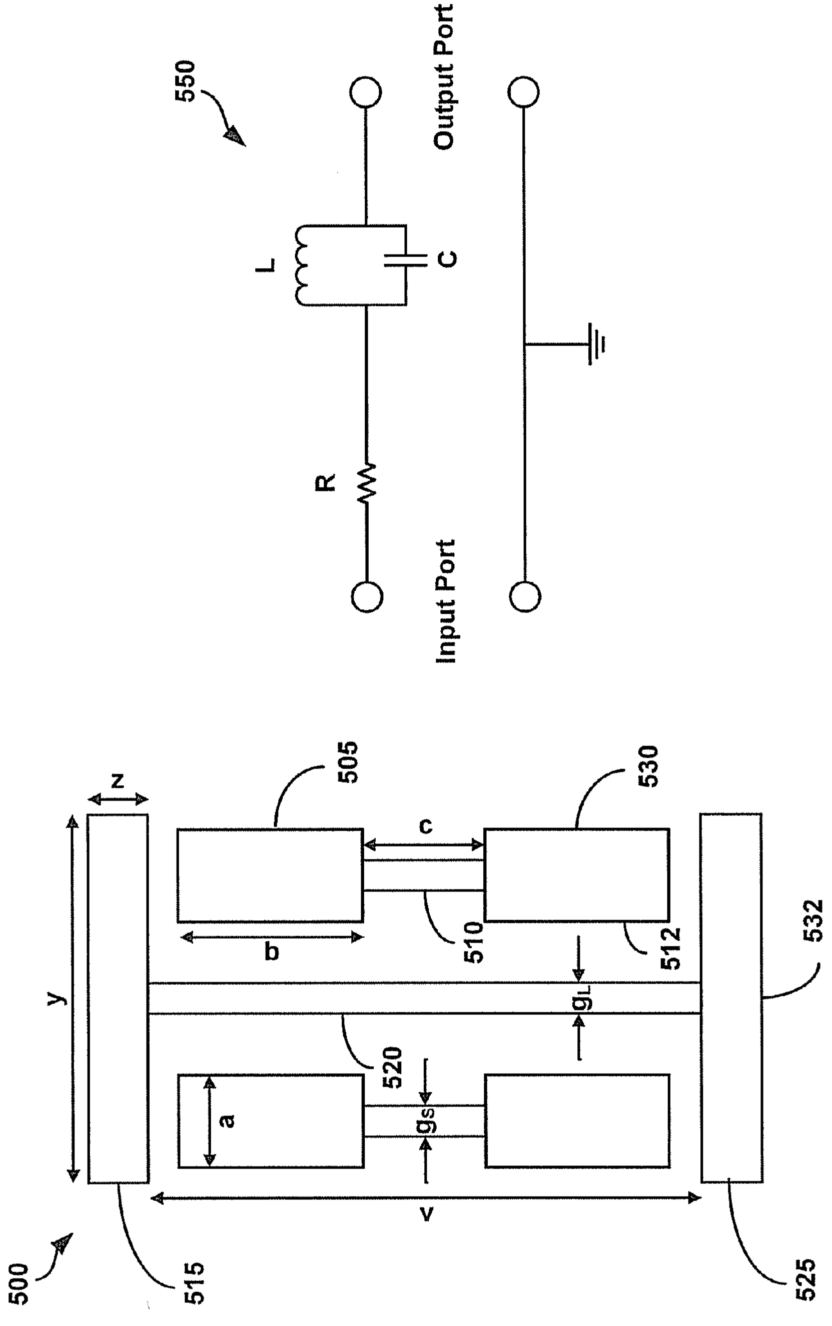
FIG. 5 is an example circuit model of example defected ground structures in a microstrip transmission line that phase shifts an RF signal.

FIG. 5 is an example circuit model 550 of an example defected ground structures 500 in a microstrip transmission line that phase shifts an RF signal. As discussed in FIG. 4, the dimensions of transmission components as well as DGS structures may contribute to the phase shift of the RF signal. The DGS structure may be a nested dumbbell structure 500 such that two short stem dumbbell DGS structures 530 are nested within a long stem dumbbell DGS structure 532. The short stem dumbbell DGS structure 530 comprises two rectangular or square defects (505 and 512) connected by a narrow slot 510. A length of the rectangular defects (505 and 512) is "a" and a width of the rectangular defects (505 and 512) is "b". The width of the narrow slot 510 is $g_s$. Alternatively, the long stem dumbbell DGS structure 532 comprises two narrow rectangular defects (515 and 525) with length "y" and width "z" connected by a narrow slot 520 with width $g_L$.

DGS structures can shift the phase of the signal because the DGS structures change inductance and capacitance of the transmission line based on DGS structure dimensions. An etched defect in the ground plane may disturb current distribution in a stationary ground plane. Such disturbances can change characteristics of a transmission line such as line capacitance and inductance. Etched areas of a DGS structure may give rise to increasing the effective capacitance and inductance of a transmission line. Thus, an example equivalent LC circuit 550 can represent a DGS structure 500, as shown in FIG. 5. Values for the effective capacitance and effective inductance in the equivalent parallel LC circuit model may be based on the dimensions of the DGS structures.

The dumbbell structure includes a narrow stem cell connected to two wide etched (e.g. rectangular) regions which contribute to a net effective capacitance and inductance of the transmission line, respectively. The stem width $g_s$ 510 and $g_L$ 520 are inversely proportional to the amount of effective capacitance. That is, a decrease in width of either stem $g_s$ 510 and $g_L$ 520 increases the effective capacitance of the transmission line. The wide etched rectangular areas of dimension "a" 505 and "b" 512 and "y" 515 and "z" 525, respectively, are directly proportional to the effective inductance of the transmission line. That is, an increase in the area of rectangular regions (505, 515, 530) increases the inductance of the transmission line.

The parallel LC circuit model in FIG. 5 may show that the DGS structures behave like a low pass or bandgap filter. Accordingly, a resonance occurs at a certain frequency due to the parallel LC circuit. The resonance frequency is a frequency at which a parallel LC circuit has infinite impedance. The rectangular defects of the short stem dumbbell DGS structure 530 increase route length of a current and the effective inductance of the transmission line. The narrow slot of the short stem dumbbell DGS structure 510 may accumulate charge and increases the effective capacitance of the transmission line. Alternatively, when the etched gap distance decreases, the effective capacitance decreases such that the attenuation pole location (resonance frequency) moves up to a higher frequency. Further, as the etched area of the unit DGS structure increases, the effective inductance increases giving rise to a lower cutoff frequency or the 3 dB point of the low pass or bandgap filter, for example.

Further, analyzing the parallel LC circuit model in FIG. 5 shows an example in which the DGS structure shifts the phase of an RF signal traveling along a signal line of a transmission line. The inductance and capacitance in the parallel LC circuit gives rise to reactance in the circuit. Alternatively, the circuit may contain impedances that have resistive components as well as the reactive components. When an RF signal is applied to the input port of a parallel LC circuit having both resistive and reactive components, the RF signal may be shifted in phase at the output port of the circuit. The phase of the signal at the output port could be given by $$\theta=\beta l \quad (1)$$

where $\beta$ is the propagation constant and $l$ is the physical length of the transmission line. Further $$\beta=\omega(LC)^{1/2} \quad (2)$$

where $\omega$ is the frequency of operation, L and C are the equivalent inductance and capacitance, of the transmission line respectively. Thus from the above equations (1) and (2), the change in the line inductance and capacitance attributed by the DGS structures can, in turn, change the phase of the output RF signal.

Analyzing the parallel LC circuit in FIG. 5, an overall impedance (Z) can be determined based on the values of R, L, and C. The overall impedance of the LC circuit may be of the form Z=R+jX where R represents the resistive and X represents the reactive components of the overall impedance Z, respectively. Hence, when an RF signal is applied to an input port of the parallel LC circuit, then the RF signal at an output port may have a shifted phase. The shifted phase may be equal to the arctan(X/R).

In one example, the DGS structures and covering of the structures by a moveable ground plane may give rise to inductance and capacitance values to the transmission line of about 3.6 nH and about 0.1 pF, respectively, for example. Further, the resistive component of the overall impedance of the transmission line may be equal to about 50Ω. The overall impedance of the parallel LC circuit model for the transmission line for an RF signal operating at a frequency of about 8 GHz may be found by the following:

$$Z=R+jX=R-j\frac{\omega L}{\omega^2 LC-1} \quad (3)$$

Thus, for the values for R, L, C and $\acute{\omega}$ (2πf where f=8 GHz), the overall impedance is given by Z=50−22.5j. Further, the phase shift of the RF signal is given by the arctan(−22.5/50)=24 degrees. Therefore, the RF signal at the output port of the transmission line has a phase shift equal to about 24 degrees.

In addition, the phase shift of the RF signal may be adjusted by varying the reactive components (inductance or capacitance) of the parallel LC circuit. Hence, the phase of an RF signal may be varied using a transmission line by varying the dimensions of the DGS structures which give rise to the values of the reactive components (inductance and capacitance) components of the transmission line. Values for the inductance and capacitance vary depending on the shape and dimensions of the DGS structures. The equivalent circuit of a DGS structure is derived by simulating a single DGS structure along with a microstrip line using simulation and test equipment such as a 3D EM simulator. For example, for a nested dumbbell structure, simulation results may show a one pole low pass filter response with a 3 dB cut off frequency and an attenuation pole frequency. Values of equivalent L and C can be calculated by the following formulae:

$$C=\omega_0/Z_0 g_1(\omega_0^2-\omega_c^2) \quad (4)$$

$$L=\tfrac{1}{4}\pi^2 f_0^2 C \quad (5)$$

where $\omega_0$ is the angular frequency at the location of the attenuation point, $\omega_c$ is the angular frequency at the 3 dB cutoff point, $Z_o$ is the characteristic impedance of the transmission line, $g_1$ is a prototype value of a Butterworth low pass filter of first order=2, $f_0$ is the frequency at the 3 db cutoff point.

In addition, a moveable ground plane covering the etched DGS structures on the stationary ground plane may also vary the inductance and capacitance of the transmission line resulting in adjusting the phase of the RF signal traveling along the signal line. The movable ground plane that slides above the DGS structures can be made to fully open or fully close or partially close the DGS structures. When the DGS structures are fully closed there is no reactive loading in the line and the signal line directly transmits the signal in the input port to the output port with a phase proportional to the physical length of the line, also called the reference phase.

When the movable ground plane is kept at fully open position, the maximum reactive loading occurs and thus, the signal at the output port has a shifted phase when compared to the reference phase. The effective phase shift between the fully closed and fully open state is given by Effective maximum phase shift=Phase at fully open state−Reference phase (6)

However, when the movable ground plane is at intermediate positions resulting in partially opened defected ground structures, the transmission line may have reactive loading less than the maximum loading due to the fully open stage. Thus, intermediate phase values which are less than that obtained in the fully open stage and greater than that obtained in the fully closed stage are achieved. For example if a line of length X has a reference output phase of 20 degrees in fully closed stage and 200 degrees in fully open stage, then the movement of the movable ground plane would result in phase values in between 20 and 200 degrees.

The phase shift of the RF signal can range from about 0 degrees when the moveable ground plane is fully open (covers no portion of the stationary ground plane and/or any portion of the DGS structures) up to about 190 degrees when fully closed (covers almost every portion of the stationary ground plane and/or almost every portion of the DGS structures), for example.

Figure 6:
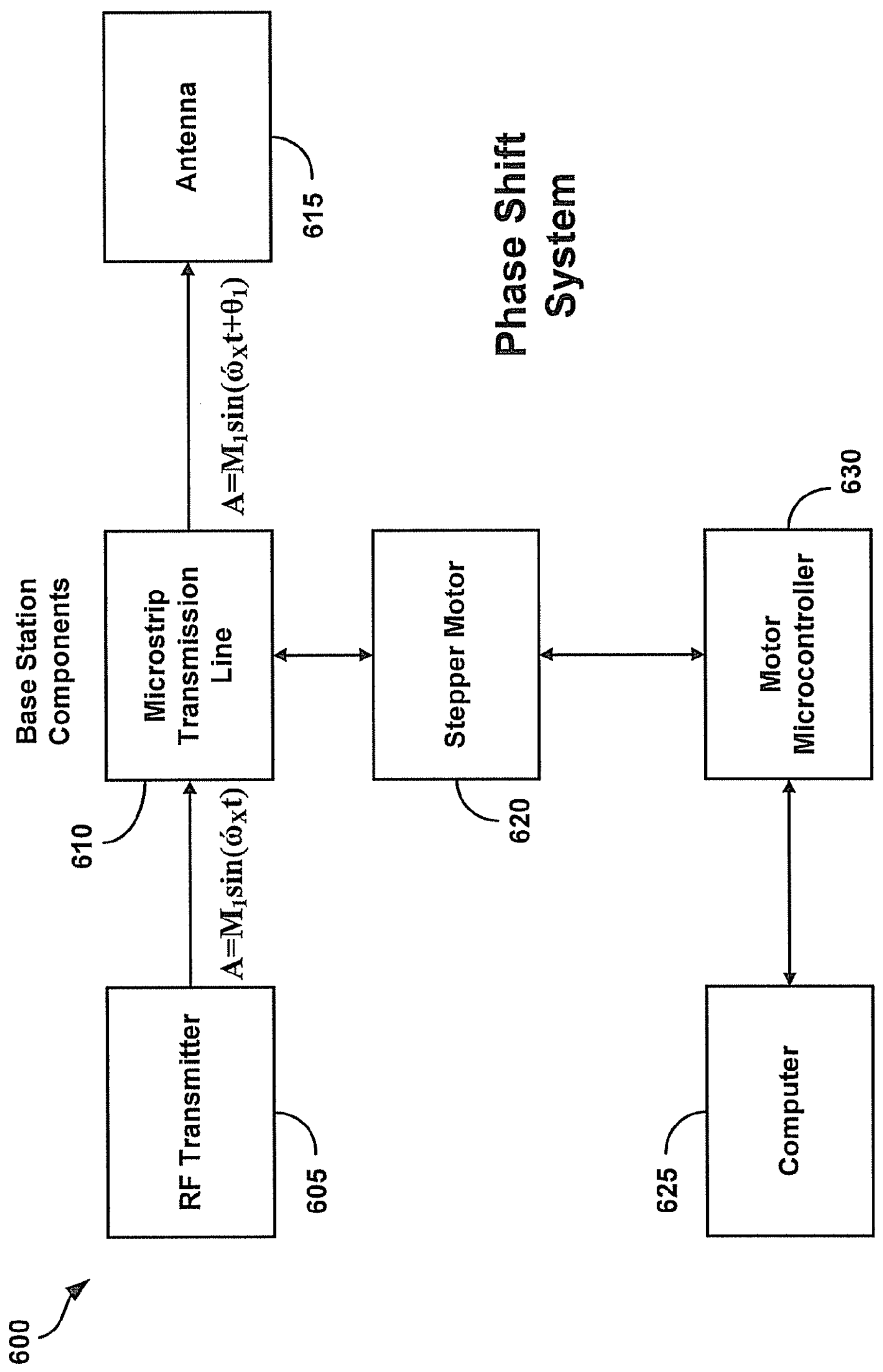
FIG. 6 is an example functional block diagram of a phase shift system using a microstrip transmission line and stepper motor to control phase shift in an RF signal.

FIG. 6 is an example functional block diagram of a phase shift system 600 using a microstrip transmission line 610 and stepper motor 620 to control phase shift in an RF signal. The microstrip transmission line 610 receives a signal from an RF transmitter 605, and subsequently passes a phase shift signal to an antenna 615.

A moveable ground plane (not shown) of a microstrip transmission line may further adjust the phase shift of an RF signal by covering a portion of a stationary ground plane and portions of a series of DGS structures. The moveable ground plane may be controlled manually or by the stepper motor 620. A stepper motor (or step motor) may be a brushless, synchronous electric motor that can divide a full rotation of a motor into a large number of steps. A position of the stepper motor 620 can be controlled precisely, without any feedback mechanism, for example.

A stepper motor may have multiple toothed electromagnets arranged around a central gear-shaped piece. The electromagnets are energized by an external control circuit, such as a microcontroller. To make the motor shaft turn, first one electromagnet is given power, which makes the gear's teeth magnetically attracted to the electromagnet's teeth. When the gear's teeth are thus aligned to the first electromagnet, the teeth are slightly offset from the next electromagnet. Hence, when the next electromagnet is turned on and the first is turned off, the gear rotates slightly to align with the next electromagnet, and from there the process is repeated. Each slight rotation may be called a "step," with an integer number of steps making a full rotation. In that way, the motor can be turned by a precise angle.

The stepper motor 620 may be controlled by a motor microcontroller 630 such that the phase of the RF signal can be controlled in a precise manner to reduce interference with other RF signals on the same frequency destined to other user terminals. The motor microcontroller 630 may be programmed in advance or in real-time by computer 625 to adjust the phase of an RF signal based on the dimensions of the transmission line, substrate, signal line, stationary and moveable ground planes as well as the DGS structures and other transmission line components.

The computer 625 may include one or more user interfaces and/or electronic input/output ports to receive the dimensions of the transmission line components as well as a target beam tilt value and a target phase shift for the RF signal. The method in which the phase is adjusted based on the target beam tilt value and the dimensions and the target phase shift is discussed when describing FIG. 9.

Figure 7:
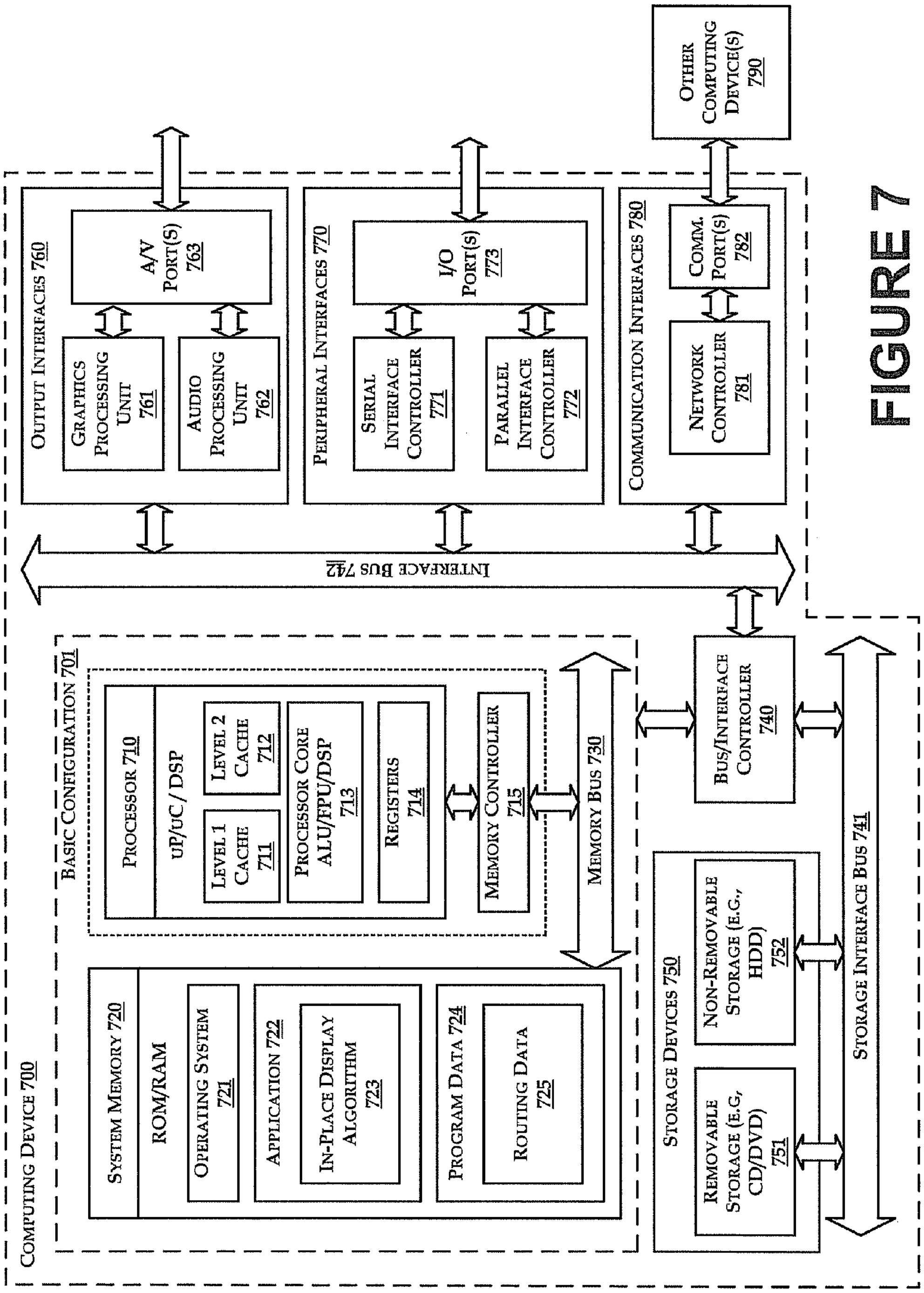
FIG. 7 is a block diagram illustrating an example computing device 700 used to control a stepper motor as part of an example phase shift system.

FIG. 7 is a block diagram illustrating an example computing device 700 that is used to control a stepper motor as part of an example phase shift system. In a very basic configuration 701, computing device 700 typically includes one or more processors 710 and system memory 720. A memory bus 730 can be used for communicating between the processor 710 and the system memory 720. Depending on the desired configuration, processor 710 can be of any type including but not limited to a microprocessor (μP), a microcontroller (μC), a digital signal processor (DSP), or any combination thereof. Processor 710 can include one more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 typically includes an operating system 721, one or more applications 722, and program data 724. Application 722 includes control input processing algorithm 723 that is arranged to provide inputs to the electronic circuits, in accordance with the present disclosure. Program Data 724 includes control input data 725 that is useful for minimizing power consumption of the circuits, as will be further described below. In some example embodiments, application 722 can be arranged to operate with program data 724 on an operating system 721 such that power consumption by an electronic circuit is minimized. This described basic configuration is illustrated in FIG. 7 by those components within dashed line 701.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Exemplary computer storage media can include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Exemplary output interfaces 760 include a graphics processing unit 761 and an audio processing unit 762, which can be configured to communicate to various external devices such as a display or speakers via one or more A/V ports 763. Exemplary peripheral interfaces 760 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773. An exemplary communication interface 780 includes a network controller 781, which can be arranged to facilitate communications with one or more other computing devices 790 over a network communication via one or more communication ports 782. The Communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

Figure 8:
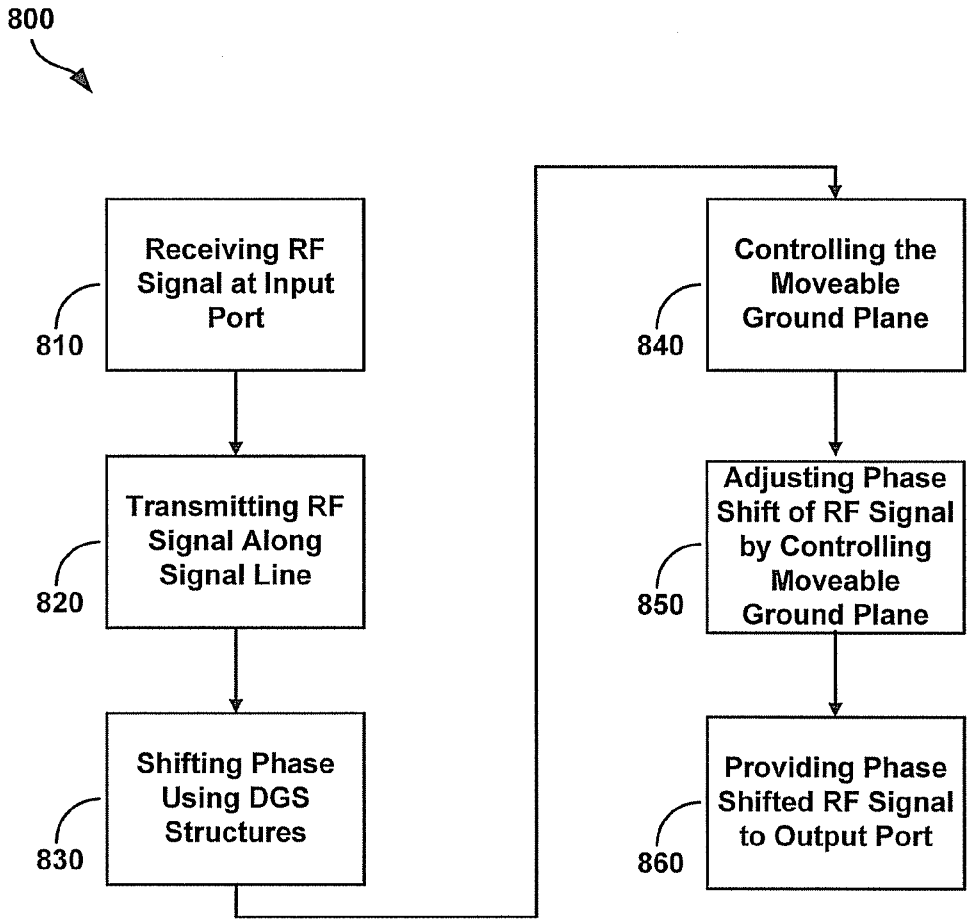
FIG. 8 is a flowchart for an example method for phase shifting an RF signal.

FIG. 8 is a flowchart for an example method for phase shifting an RF signal. The method may comprise receiving an RF signal at an input port of a signal line of a microstrip transmission line, as shown at block 810, from an RF transmitter or some other device within a base station. A further step may be transmitting the RF signal across the signal line to an output port, as shown at block 820. The signal line may comprise of conducting material that is coupled to one side of a substrate of the transmission line. Additionally, one or more types of DGS structures may be used to phase shift the RF signal, as shown at block 830. The DGS structures may be constructed by etching conducting material onto a stationary ground plane of the transmission line. Further, the stationary ground plane is coupled onto an opposite side of the substrate with respect to the signal line. Also, the phase shift of the RF signal may be adjusted by covering a portion of the one or more defected ground structures, the stationary ground plane, and the associated planar surface of the substrate with a moveable ground plane, as shown at block 840. The method may include controlling the moveable ground plane to cover the DGS structures, stationary ground plane, and the substrate using a stepper motor and/or computer, as shown at block 850. Another step in the method may be providing the phase shifted RF signal at an output port such that the RF signal can be transmitted to a base station antenna, as shown at block 860.

Figure 9:
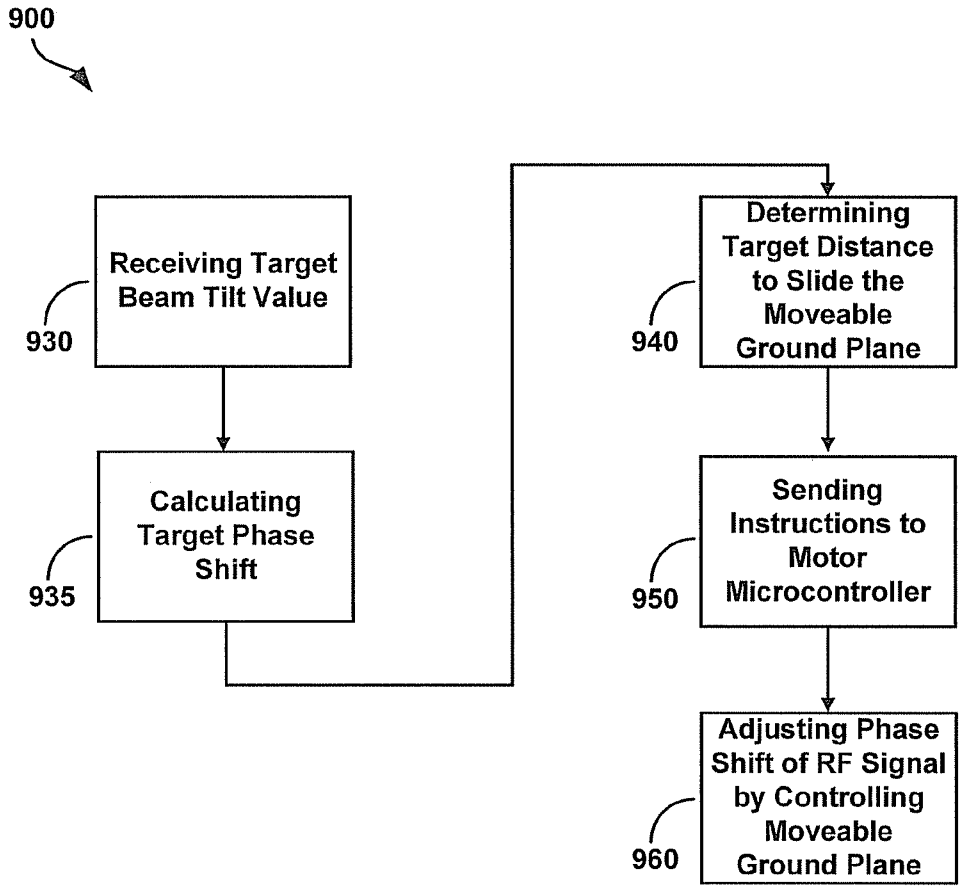
FIG. 9 is a flowchart for an example method for controlling a moveable ground plane of a microstrip transmission line to adjust a phase of an RF signal.

FIG. 9 is a flowchart 900 for an example method for controlling a moveable ground plane of a microstrip transmission line to adjust a phase of an RF signal. As discussed when describing FIG. 6, a stepper motor may control a moveable ground plane to cover portions of a microstrip transmission line as part of a phase shift system to further adjust the phase of an RF signal. A microcontroller and a computer together may control the stepper motor based on the dimensions of transmission line components. The example method may include the computer receiving a target beam tilt value of the antenna at a user interface and/or input/output port, as shown at block 930. The beam tilt of an antenna in an antenna array may correspond to a phase shift in a transmitted RF signal. The method may calculate a target phase shift be provided to the input of each antenna element in the base station antenna array using an automatic computer based program, as shown at block 935. Thereafter, the computer may determine a target distance to slide the moveable ground plane and cover portions of the transmission line components to achieve the target phase shift, as shown at block 940, based on the inductance, capacitance, and resistive effects arising from etched DGS structures on the stationary ground plane and covering provided by the moveable ground plane. The target distance may be obtained from a look-up table as shown in Table 1 linked to a computer program. The look-up table may be generated by phase measurements of an RF signal at an output port of a transmission line using a network analyzer while varying the movable ground plane Another step in the method includes sending instructions to a microcontroller that controls the stepper motor, as shown at block 950. An additional step may include the microcontroller adjusting the stepper motor which in turn slides the moveable ground plane, as shown at block 960, to the target distance thereby adjusting the phase of the RF signal to the target phase shift. Additional steps in the method may include the computer receiving as input the dimensions of the transmission line components, at a user interface and/or input/output port. The dimensions may include the microstrip transmission line itself, a substrate, a signal line, a stationary and a moveable ground planes as well DGS structures etched into the stationary ground plane. Thereafter the computer may then model the transmission line components as an equivalent parallel LC circuit and calculate inductance, capacitance, and resistive values of the LC circuit.

Example values of distances to slide the moveable ground plane to cover a microstrip transmission line with a series DGS structures and associated phase shifts are shown in Table 1. The unit DGS structure of the series DGS structures comprises of two short stem dumbbell structures nested in a long stem dumbbell structure.

TABLE 1

| Sliding Length (mm) | Phase Shift (Deg) |
|---|---|
| Fully Open | 0 |
| 2 | 39 |
| 4 | 54 |
| 6 | 70 |
| 8 | 78 |
| 10 | 86 |
| 12 | 99 |
| 14 | 108 |
| 16 | 127 |
| 18 | 150 |
| 20 | 178 |
| 22 | 182 |
| 24 | 183 |
| 26 | 186 |
| 28 | 188 |
| 30 | 188 |
| 32 | 188 |
| 34 | 189 |
| 36 | 189 |
| 38 | 189 |
| Fully Closed | 190 |

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim 1ncludes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device for phase shifting a radio frequency (RF) signal for a base station antenna, the device comprising:

a substrate having a top planar surface and a bottom planar surface;

a stationary ground plane coupled to the top planar surface of the substrate;

a signal line on the bottom planar surface of the substrate, wherein the signal line comprises an input port, an output port, and conducting material, wherein the input port receives the RF signal having a first phase and the conducting material transmits the RF signal across the bottom planar surface of the substrate to the output port, and wherein the RF signal has a second phase at the output port;

a plurality of types of defected ground structures on the top planar surface, wherein a first type of defected ground structure is a short stem dumbbell structure and a second type of defected ground structure is a long stem dumbbell structure, wherein the first type of defected ground structure is nested within the second type of defected ground structure, wherein the defected ground structures are operable to shift a phase of the RF signal from the first phase at the input port to the second phase at the output port, and wherein a difference between the second phase and the first phase is a phase shift of the RF signal; and a movable ground plane operable to cover a portion of the plurality of types of defected ground structures, the top planar surface of the substrate, and the stationary ground plane, thereby adjusting the phase shift of the RF signal.

2. The device of claim 1, further comprising a stepper motor configured to slide the moveable ground plane a target distance to cover the plurality of types of defect ground structures, top planar surface of the substrate, and the stationary ground plane to adjust the phase of the RF signal.

3. The device of claim 2, further comprising a microcontroller configured to control an amount of rotation of the stepper motor to slide the moveable ground plane the target distance.

4. The device of claim 3, further comprising a computer with a user interface operable to receive a target beam tilt value for the base station antenna.

5. The device of claim 4, wherein the computer is configured to calculate a target phase shift based on the target beam tilt value and the dimensions of the signal line, the substrate, the stationary ground plane, the plurality of types of defected ground structures, and the moveable ground plane; and to determine the target distance to slide the moveable ground plane to cover portions of the signal line, the substrate, the stationary ground plane, and the plurality of types of defected ground structures to achieve the target phase shift.

6. The device of claim 4, wherein the computer is configured to send instructions to the microcontroller to rotate the stepper motor the amount of rotation that allows the stepper motor to slide the moveable ground plane the target distance.

7. The device of claim 4, further comprising an RF transmitter to modulate the RF signal at an operating frequency.

8. The device of claim 4, wherein the first type and the second type of defected ground structures are selected from a group consisting of rectangular, triangular, and circular defected ground structures.

9. A method for phase shifting a radio frequency (RF) signal for a base station antenna, the method comprising:

receiving an RF signal having a first phase at an input port of a signal line;

transmitting the RF signal across the signal line to an output port, wherein the signal line is on a bottom planar surface of a substrate and the substrate is part of a transmission line;

shifting a phase of the RF signal from a first phase at the input port to a second phase at the output port using a plurality of types of defected ground structures on a top of a stationary ground plane attached to a top planar surface of the substrate, wherein a first type of defected ground structure is a short stem dumbbell structure and a second type of defected ground structure is a long stem dumbbell structure, wherein the first type of defected ground structure is nested within the second type of defected ground structure, and wherein a difference between the second phase and the first phase is a phase shift of the RF signal;

adjusting the phase shift of the RF signal by covering a portion of the plurality of types of defected ground structures, the stationary ground plane, and the top planar surface of the substrate with a moveable ground plane; and providing the RF signal having the second phase at the output port.

10. The method of claim 9, further comprising receiving a target beam tilt value for the base station antenna using a computer.

11. The method of claim 10, further comprising calculating a target phase shift based on the target mean tilt value and the dimensions of the transmission line, signal line, the substrate, the stationary ground plane, the plurality of types of defected ground structures, and the moveable ground plane.

12. The method of claim 11, further comprising determining a target distance to slide the moveable ground plane to cover portions of the transmission line, signal line, the substrate, the stationary ground plane, and the plurality of types of defected ground structures to achieve the target phase shift.

13. The method of claim 12, further comprising sending instructions to a microcontroller to rotate a stepper motor an amount that allows the stepper motor to slide the moveable ground plane the target distance.

14. The method of claim 9, wherein an RF transmitter modulates the RF signal at an operating frequency.

15. The method of claim 9, wherein the first type and the second type of defected ground structures are selected from a group consisting of rectangular, triangular, and circular defected ground structures.

16. A non-transitory computer-readable medium having stored thereon, computer-executable instructions that, when executed by a device, cause the device to perform functions comprising:

receiving a target beam tilt value for a base station antenna; and calculating a target phase shift based on the target beam tilt value and dimensions of a transmission line, a signal line, a substrate, a stationary ground plane, a moveable ground plane, and a plurality of types of defected ground structures, wherein a first type of defected ground structure is a short stem dumbbell structure and a second type of defected ground structure is a long stem dumbbell structure, and wherein the first type of defected ground structure is nested within the second type of defected ground structure.

17. The non-transitory computer-readable medium of claim 16, wherein the functions further comprise determining a target distance to slide the moveable ground plane to cover portions of the transmission line, the signal line, the substrate, the stationary ground plane, and the plurality of types of defected ground structures to achieve the target phase shift.

18. The non-transitory computer-readable medium of claim 17, wherein the functions further comprise modulating the RF signal at an operating frequency.

19. The non-transitory computer-readable medium of claim 17, wherein the functions further comprise sending instructions to a microcontroller to rotate a stepper motor an amount that allows the stepper motor to slide the moveable ground plane the target distance.

20. The non-transitory computer-readable medium of claim 16, wherein the first type and the second type of defected ground structures are selected from a group consisting of short stem dumbbell, and long stem dumbbell, rectangular, triangular, and circular defected ground structures.

* * * * *

UNITED STATES PATENT AND TRADEMARK OFFICE

CERTIFICATE OF CORRECTION

PATENT NO. : 8,670,720 B2
APPLICATION NO. : 13/710330
DATED : March 11, 2014
INVENTOR(S) : Abhaikumar et al.

It is certified that error appears in the above-identified patent and that said Letters Patent is hereby corrected as shown below:

On the Title Page, Item (73), under "Assignee", in Column 1, Line 2, delete "Tamilnadu, IN (US)" and insert -- Tamil Nadu (IN) --, therefor.

Signed and Sealed this
Twenty-first Day of April, 2015

Michelle K. Lee

Michelle K. Lee
*Director of the United States Patent and Trademark Office*